Oct. 21, 1924.
A. W. FOSTER
1,512,753
BREEDING CRATE
Filed Oct. 9, 1922
6 Sheets-Sheet 5
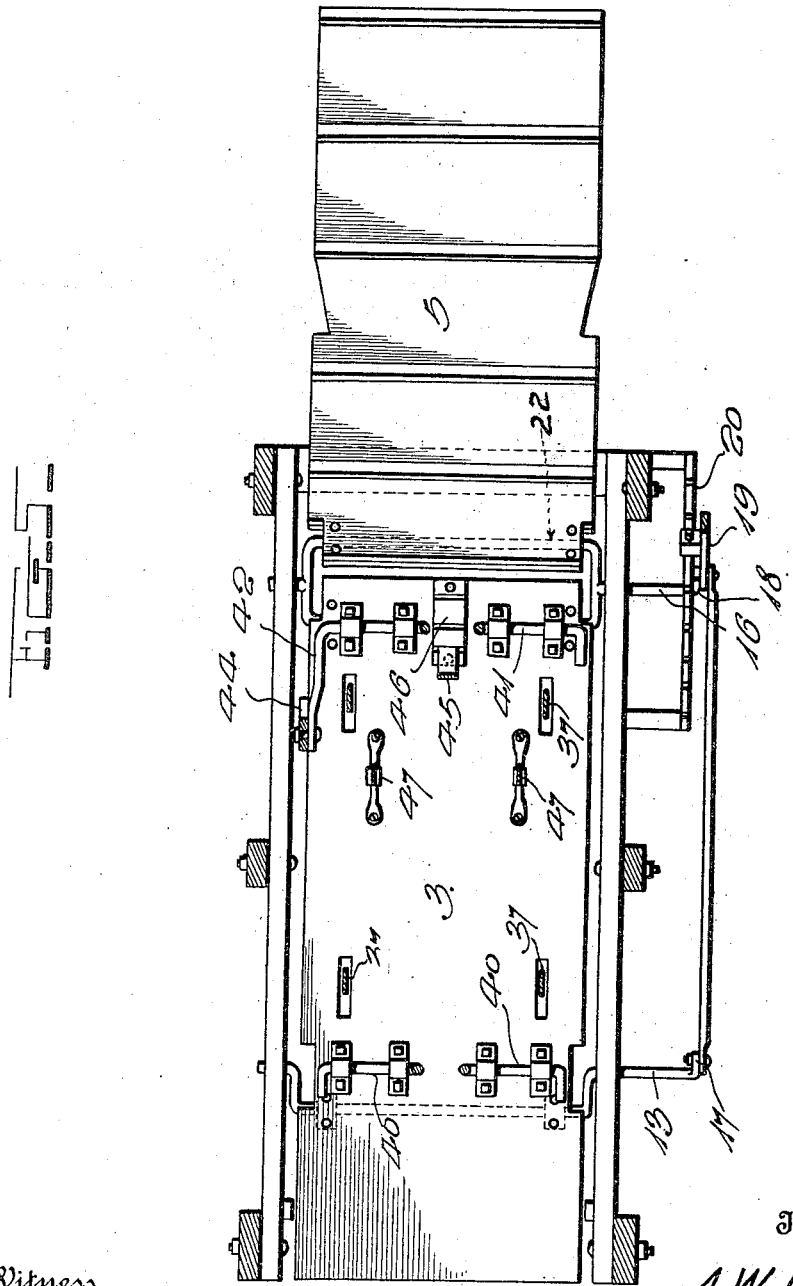
Witness
H. Woodard
Inventor
A.W. FOSTER
By H.B. Willson &co
Attorneys

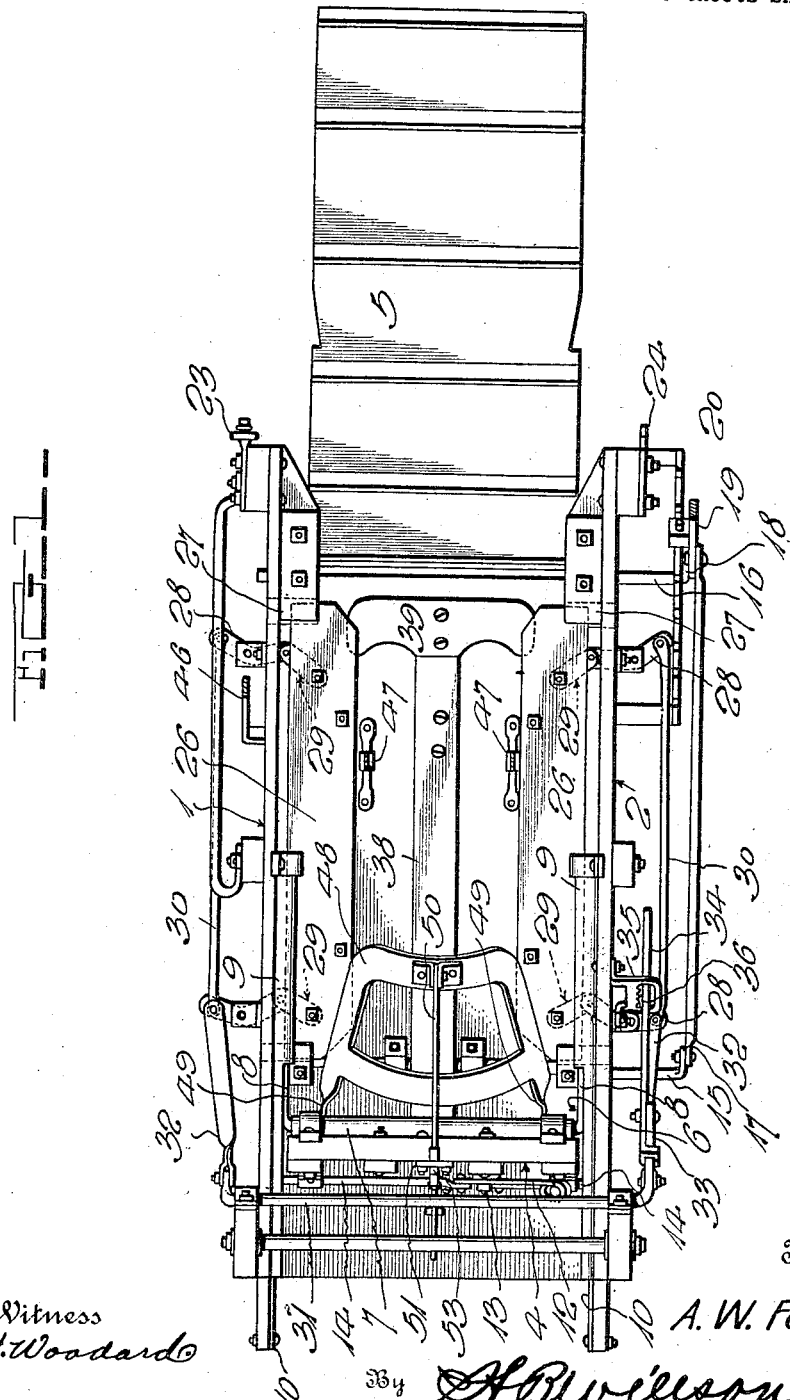

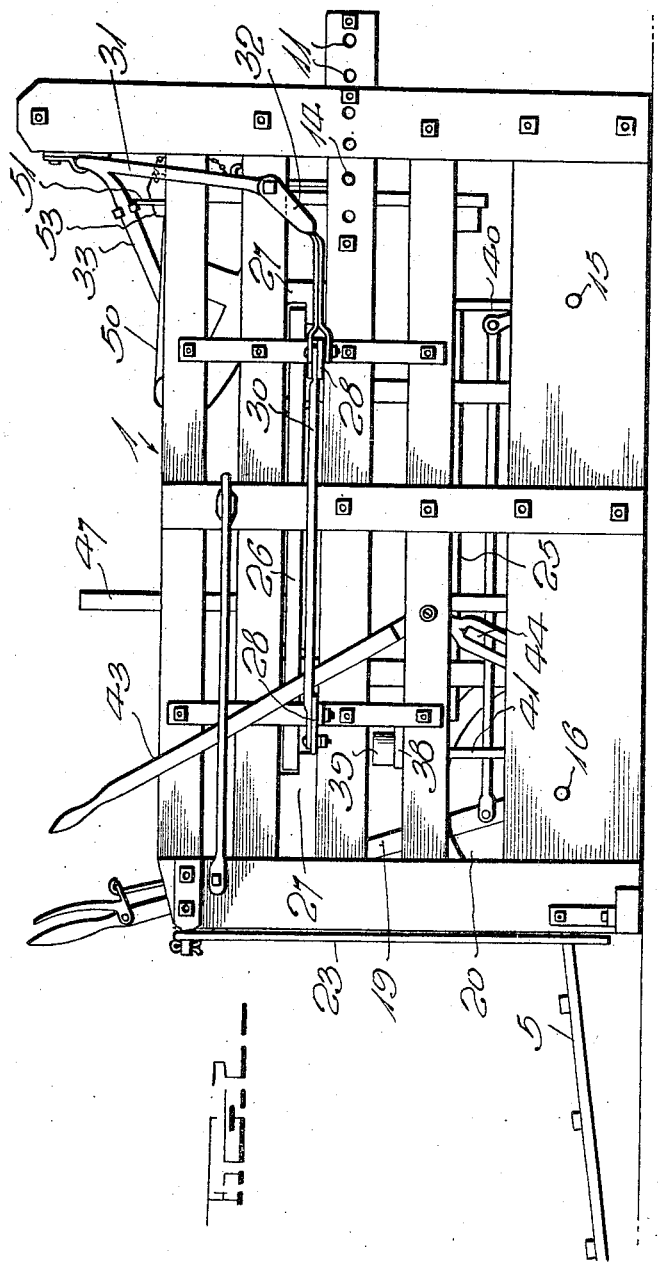

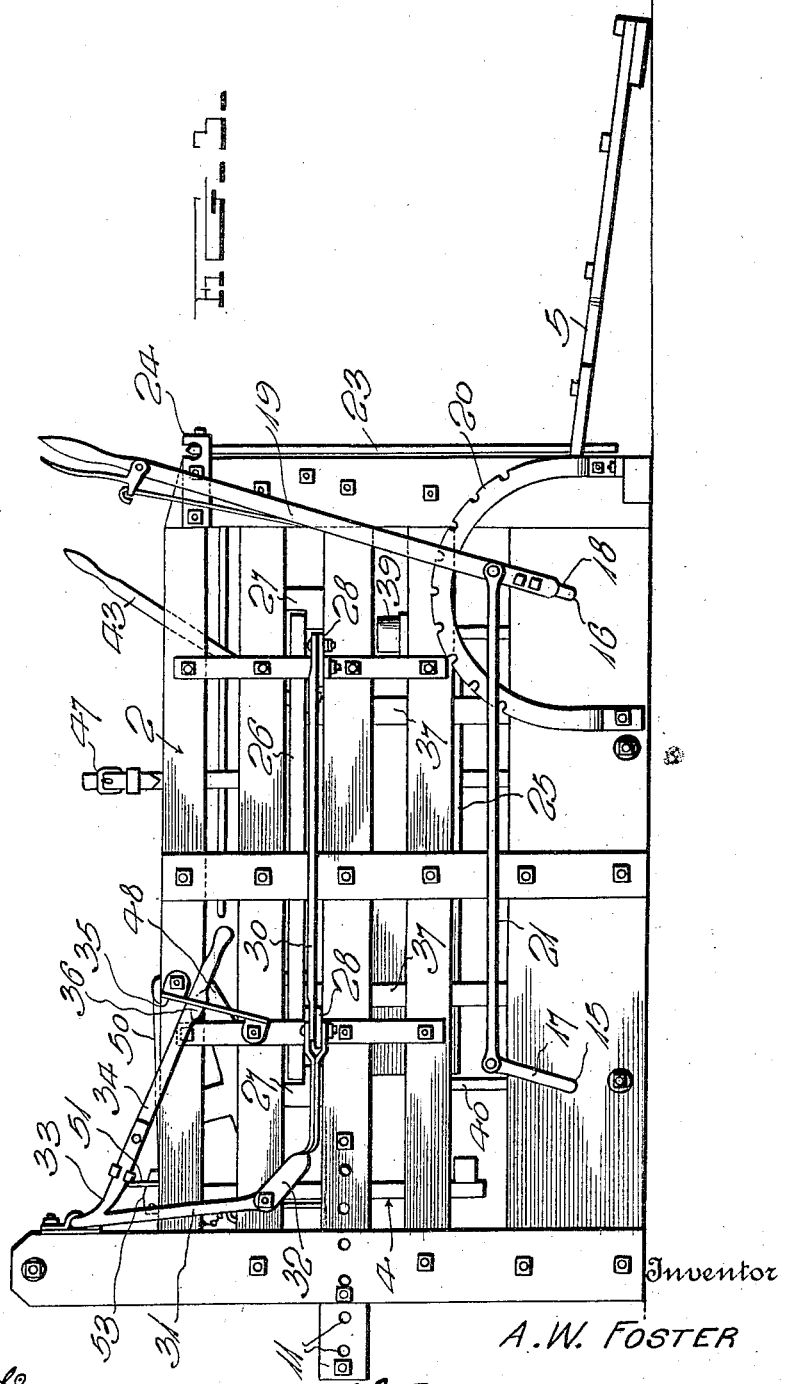

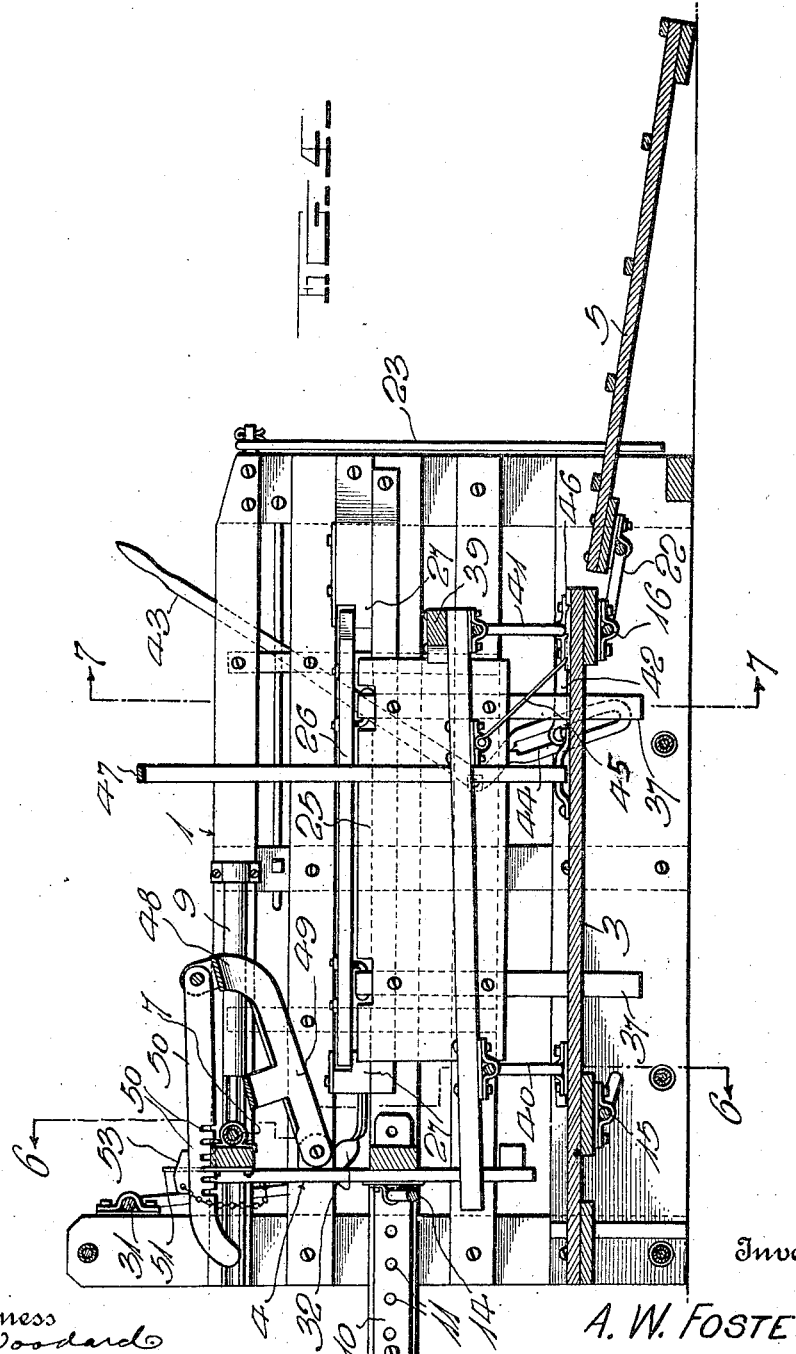

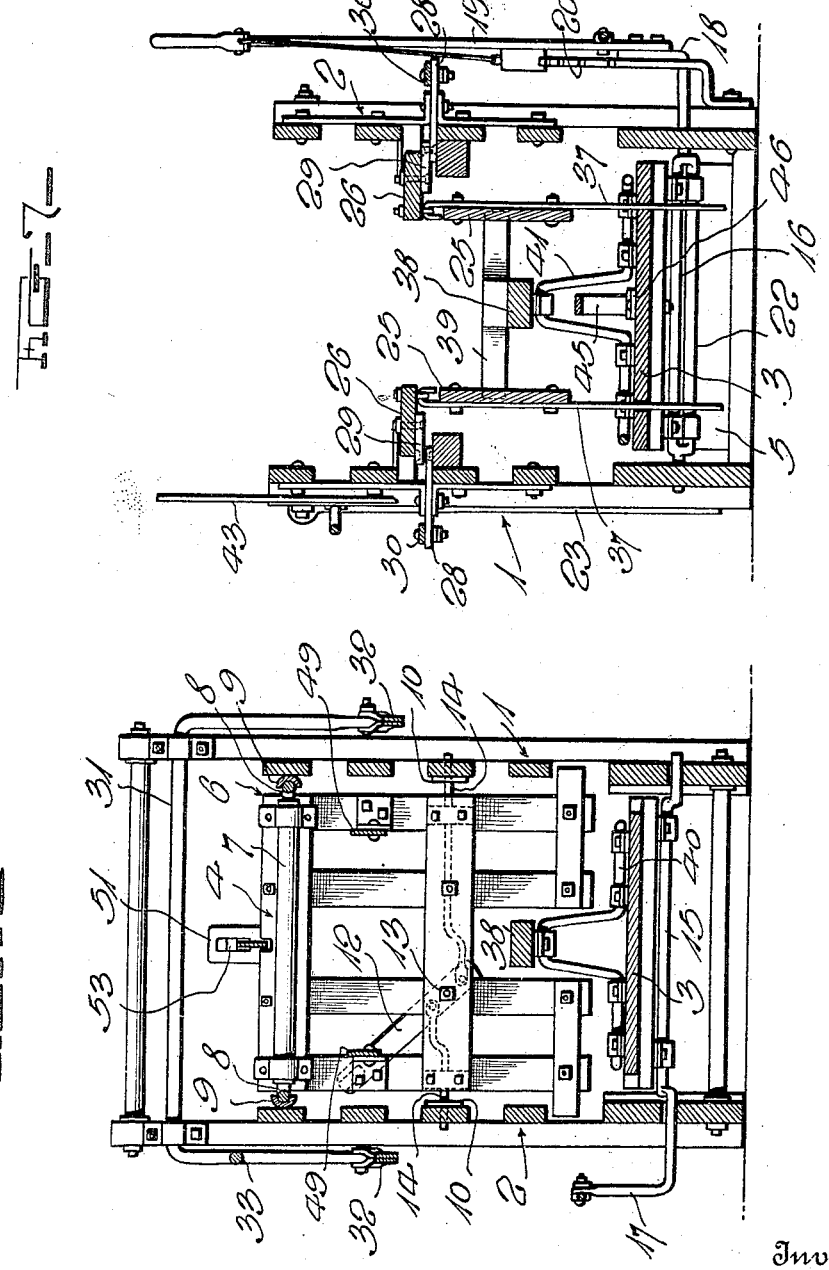

Patented Oct. 21, 1924.

1,512,753

UNITED STATES PATENT OFFICE.

AUGUSTUS W. FOSTER, OF MALVERN, IOWA.

BREEDING CRATE.

Application filed October 9, 1922. Serial No. 593,387.

*To all whom it may concern:*

Be it known that I, AUGUSTUS W. FOSTER, a citizen of the United States, residing at Malvern, in the county of Mills and State of Iowa, have invented certain new and useful Improvements in Breeding Crates; and I do declare the following to be a full, clear, and exact description of the invention, such as will enable others skilled in the art to which it appertains to make and use the same.

This invention relates to an improved breeding crate and one object of the invention is to provide a breeding crate so constructed that a sow may be placed in the crate and secured against movement and held in a standing position, the crate being further so constructed that the flooring of the crate may be vertically adjusted and at the same time a gangway upon which the sire will stand will also be vertically adjusted but moved in an opposite direction to the flooring. Therefore, the sire may be placed in a relatively elevated position or the sow or dam placed in a relatively elevated position thus permitting of breeding between animals of different sizes.

Another object of the invention is to provide clamping means for engaging the sides of the animal so that the animal will be securely wedged in the crate.

Another object of the invention is to provide improved means for slidably and pivotally mounting an end wall for the housing so that the wall may be moved longitudinally of the housing according to the size of the animal and to provide latch means so that the door may be securely held in a closed position, the latch means serving not only to hold the walls in a closed position but also serving to hold the wall in a desired position between the side walls of the crate.

Another object of the invention is to so construct this crate that the gangway may be swung upwardly to close the rear end of the crate and thus permit the crate to be used as a shipping crate as well as a breeding crate.

This invention is illustrated in the accompanying drawings, wherein:

Figure 1 is a top plan view of the improved crate.

Figure 2 is a side elevation looking at one side of the crate.

Figure 3 is a side elevation looking at the second side of the crate.

Figure 4 is a vertical longitudinal sectional view through the crate.

Figure 5 is a horizontal longitudinal sectional view through the crate.

Figure 6 is a sectional view taken along the line 6—6 of Fig. 4.

Figure 7 is a sectional view taken along the line 7—7 of Fig. 4.

This crate is provided with side walls 1 and 2, a flooring 3, an end wall or gate 4 and a gangway 5 which may form a closure for the second end of the crate when swung to a raised position. The end wall or door 4 is positioned between the side walls and in order to mount the door for pivotal movement and for adjustment longitudinally of the crate, there has been provided a supporting yoke 6 which passes through a sleeve 7 carried by the door 4 and has its arms 8 slidably mounted in tubes 9 which are secured to the upper end portions of the side walls. The outer end portions of these tubes 9 are cut away as shown in Figs. 4 and 6 so that the yoke may be moved longitudinally between the side walls and the door or wall 4 thus positioned either at the ends of the side walls or in spaced relation to the ends of the side walls. Socket plates 10 are secured against the inner faces of certain of the longitudinally extending bars which form the side walls and are provided with openings 11 which register with openings formed in the longitudinally extending bars against which these socket plates are secured. The latching means for the door 4 consists of an operating handle bar 12 which is pivotally connected with the door by means of a bolt or other similar fastener 13 and above and below the fastener 13 is loosely connected with the rods 14 which are slidably mounted and when extended outwardly through movement of the bar 12 to the position of Fig. 6, will enter certain of the openings 11 and releasably hold the door or wall 4 in a secured position.

The flooring 3 is positioned between the side walls 1 and 2 and in order to mount the flooring for vertical adjustment, there has been provided rocker shafts 15 and 16 which are in the form of crank shafts and provided with bent end portions which are journalled in the lower portions of the side walls and at one side have their end portions bent to provide arm extensions 17 and 18. From an inspection of Fig. 3, it will be seen that a latch lever 19 is connected with the arm extension 18 of the rocker shaft 16 and that this latch lever which moves in operative relation to a rack 20 is connected with the arm extension 17 of the rocker shaft 15 by means of a rod 21. Therefore, when the latch lever 19 is moved, the rocker shafts 15 and 16 will be rotated and the flooring will be moved upwardly or downwardly according to the direction in which the lever 19 is moved. After the flooring has been moved to the desired position, the latch of the latch lever will be permitted to enter one of the notches of the rack 20 and the flooring will be secured at the desired height. As previously stated, it is desired to have the gangway 5 vertically adjusted at the same time that the flooring 3 is adjusted and further that it is desired to have the flooring move upwardly while the gangway is moving downwardly. Therefore, the rocker shaft 16 has been provided with a second offset portion 22 with which the gangway is loosely connected at one end. The offset portion 22 extends in an opposite direction to the offset of the rocker shaft or crank shaft 16 and there will therefore be provided a substantially rectangular crank shaft having the flooring connected with one side and the gangway with the second side as shown in Fig. 5. From an inspection of Fig. 4, it will be readily seen that when the crank shaft 16 is turned through the medium of the latch lever 19, one side portion of this shaft will move downwardly and the second side portion will move upwardly and therefore the gangway 5 will be moved in an opposite direction to the flooring. Therefore, with the flooring raised or lowered, the gangway will be moved in an opposite direction a like amount and the dam standing upon the flooring will either be raised or lowered and the sire standing upon the gangway will be lowered or raised so that the two will be in the proper relative position. If it is desired to use this crate simply as a confining pen when shipping an animal from one place to another, the animal will be placed in the crate and preferably secured against movement so that it cannot be injured and the gangway will then be swung upwardly to close the open end of the crate and the securing bar 23 will be swung to extend across the outer face of the elevated gangway and the free end portion of this securing bar dropped into the socket 24.

When the pen is in use, the sow is led or driven into the pen with the flooring and upper end of the gangway in the relative position shown in Fig. 4. The gangway can then be swung to a closed position and secured in the closed position until the sow has been secured against movement. In order to confine the animal against turning in the pen and in order to assist in holding the animal against movement, there have been provided side boards 25 which are loosely connected at their upper ends with supporting bars or boards 26. These boards 26 are slidably mounted in guides 27 and are connected with bell crank levers 28 by short strips 29 which are pivotally connected with the supporting boards 26 and inner end portions of the bell crank levers 28. The outer end portions of these bell crank levers 28 are connected by rods 30 so that the bell crank levers will be moved together. Therefore, the forward and rear end portions of the clamping boards 25 will be moved together but, due to the fact that the bell crank levers are connected with the boards 26 by means of the strips or links 29, the end portions of the boards may have independent movement and if the two end portions of the boards do not engage the animal at the same time, the boards may assume the proper position for engaging the sides of the animal for the greater portion of the length thereof. In order to operate the clamping boards, there has been provided a yoke 31 which has its arms extending downwardly and connected with the bell crank levers for the forward end portions of the boards by means of links 32 which yoke is provided with a lever extension 33 which carries a handle 34 which extends through a rack 35 and is provided with a tooth 36 for engaging the teeth of the rack 35 and securely but releasably holding the boards in clamping engagement with the sides of the animal. From an inspection of Figures 4 and 7, it will be readily seen that the hinge strips 37 of the clamping boards 25 are extended downwardly below these boards and extend through openings formed in the flooring 3.

In addition to holding the animal by means of the side-engaging boards, it is desired to prevent the animal from backing out of the pen and further to prevent it from lying down in the pen. In order to do so, there has been provided a supporting bar 38 which extends longitudinally through the pen, the door or wall 4 having a space left intermediate its width so that when the door is moved inwardly to a point adjacent the head of a hog, the supporting bar may have its forward end portion extending through the door. This supporting bar is provided with a cross bar 39 at its rear end so that when the supporting bar is moved upwardly to extend longitudinally beneath the animal and support it in a standing position, the cross bar 39 will extend in back of the animal and thus prevent the animal from backing out of the crate. In order to vertically adjust the bar 38 and retain it in a raised position, there have been provided rocker shafts 40 and 41 which are in the form of crank shafts and have their crank extensions connected with the forward and rear end portions of the supporting bar. The crank shaft 41 has one end portion bent to provide a handle extension 42 and in order to turn the shaft 41 through the medium of this handle 42, there has been provided a lever 43 which is pivotally connected with the wall 1 and has its lower end portion extended at an angle to the upper end portion and provided with a slotted head 44. A bolt or other similar fastener is carried by the handle extension 42 and passes through the slot of the head 44 to slidably and pivotally connect the lever 43 with the handle 42. When the lever is moved, the rocker shaft 41 is rotated and since the rocker shafts 40 and 41 are in the form of crank shafts having their crank extensions connected with the bar 38, this bar will be vertically adjusted and can be swung up to extend longitudinally beneath the animal and retain it in a standing position and at the same time prevent the animal from backing out of the crate. A latching strip 45 is loosely connected with the under surface of this bar and when the supporting bar is swung upwardly, this latching strip will drag across the toothed socket bar 46 and by dropping into one of the sockets of this strip serve to prevent the supporting bar from moving downwardly until the latching strip is swung upwardly to an inoperative position. It will thus be seen that with this device, the animal can be clamped at the sides, supported from beneath and can be held against moving rearwardly. When the straps 47 are secured across the back of the animal, the animal will be prevented from jumping or kicking.

In order to prevent the animal from moving its head, there will be provided a head-engaging plate 48 which will be curved transversely and preferably cut out for lightness. This plate is provided with side arms 49 which are pivotally connected with the door 4 so that the plate may be swung vertically into and out of engagement with the head of the animal. In order to operate the plate, there has been provided a latching bar 50 which is loosely connected with the plate as shown in Fig. 4 and has its free end portion extending through a slot formed in a plate 51 secured at the upper end of the door. The operating bar 50 is provided with a plurality of notches 52 into which the plate 51 will fit in order to permit the plate 48 to be releasably held in proper engagement with the head of the hog. In order to prevent the hog from moving its head upwardly and thus releasing the bar 50, there hase been provided a wedge 53 which will be driven into the slot of the plate 51 above the bar 50 and securely but releasably hold the bar in the desired position. It will thus be seen that there has been provided a crate which can be adjusted to the size of the animal and which is so constructed that the animal can be securely held against movement. While it has been stated that the gangway will be swung to a closed position while securing the animal, it will be understood that this is not necessary and that the animal can be secured with the gangway in the lowered position. After the animal has been secured, the flooring will be raised or lowered to the proper position according to the size of the sow and relative size of the sire. If the two animals are approximately the same size, the flooring and gangway will be in the position shown in Fig. 4 whereas if one is larger than the other, proper adjustment will be made.

I claim:

1. A breeding crate comprising a housing having side walls and an end wall, a gangway at the second end of said housing, a flooring for said housing, rocker shafts journalled in the housing and having offset portions connected with the flooring, one of the rocker shafts having a second offset portion connected with the gangway to pivotally mount the gangway, and means for rotating the rocker shafts to move the flooring upwardly while the gangway is moving downwardly.

2. A breeding crate comprising a housing having side walls and an end wall, a bottom in said housing and a gangway at the second end of said housing, rocker shafts journalled in the housing beneath the flooring, one shaft having an offset portion loosely connected with the flooring and the second rocker shaft having opposed offset portions loosely connected with the flooring and one end portion of said gangway, and means for rotating the rocker shafts to move the flooring and gangway in opposite directions and releasably holding the same in set positions.

3. The structure of claim 2 and means for releasably holding the gangway swung to a vertical position and closing the second end of said housing.

4. A breeding crate comprising a housing having side walls and an end wall, a bottom in said housing and a gangway at the second end of said housing, rocker shafts journalled in the housing beneath the flooring, one shaft having an offset portion loosely connected with the flooring and the second rocker shaft having opposed offset portions loosely connected with the flooring and one end portion of said gangway, the rocker shafts extending through one side of said housing and provided with turning arms, a rod connecting said arms, and an actuating lever connected with said rod for imparting movement to the rod and rotate the rocker shafts to move the flooring and gangway in opposite directions and releasably holding the same in set positions.

5. A breeding crate comprising a housing having side walls, a flooring, a gangway at one end of the housing movable to close the end of the housing, an end wall for the second end of the housing, guides carried by said side walls, a yoke slidably carried by said guides and connected with the upper end portion of the end wall to mount the same for pivotal movement and sliding movement between the side walls, latch means carried by the end wall to releasably hold the same against sliding and pivotal movement, and animal securing means within the housing.

6. A breeding crate comprising a housing having side walls, a flooring, a gangway at one end of the housing movable to close the end of the housing, an end wall for the second end of the housing, clamping boards against said side walls slidably mounted for movement towards and away from the side walls, levers pivotally connected with the side walls, links connecting said levers with said boards, rods connecting the levers for each board, a rocker shaft extending across the housing and having depending arms, links connecting the arms with the rods and certain of said levers, an actuating lever for imparting movement to said rocker shaft, and means for releasably holding the actuating lever against movement with the clamping boards in an adjusted position.

7. A structure of the character described comprising an animal support, a second animal support, said supports being vertically movable, and means for pivotally connecting said supports together and for moving one support upwardly while the other support moves downwardly, one of said supports remaining in a horizontal plane and the other support being disposed at an incline with respect thereto, the inclination of said other support being varied during said vertical movement.

8. A structure of the character described comprising an animal support, a second animal support, said supports being movable vertically, a crank shaft having crank portions connected with said supports for moving said supports simultaneously but in opposite directions, with one support remaining in a horizontal position and the other at an incline and changing its angle of incline during its vertical movement, and means for imparting movement to said shaft and releasably holding the same against rotation with the supports in set positions.

In testimony whereof I have hereunto set my hand.

AUGUSTUS W. FOSTER.